US008433909B1

(12) United States Patent
Sakkos et al.

(10) Patent No.: US 8,433,909 B1
(45) Date of Patent: Apr. 30, 2013

(54) ONE-TO-MANY ELECTRONIC SIGNATURE PROCESS

(75) Inventors: George N. Sakkos, Chicago, IL (US); Carolyn Beth Carter, Hoffman Estates, IL (US); Yunzhu Chen, Wilimette, IL (US); Victoria Marguerite Kummer-Donnellan, Grayslake, IL (US)

(73) Assignee: Allstate Insurance Company, Northbrook, IL (US)

( * ) Notice: Subject to any disclaimer, the term of this patent is extended or adjusted under 35 U.S.C. 154(b) by 967 days.

(21) Appl. No.: 12/498,071

(22) Filed: Jul. 6, 2009

Related U.S. Application Data

(60) Provisional application No. 61/083,580, filed on Jul. 25, 2008.

(51) Int. Cl.
*H04L 9/32* (2006.01)
(52) U.S. Cl.
USPC .......................................................... 713/170
(58) Field of Classification Search .................... 713/170
See application file for complete search history.

(56) References Cited

U.S. PATENT DOCUMENTS

| | | | |
|---|---|---|---|
| 4,817,034 A | | 3/1989 | Hardin, Sr. et al. |
| 5,291,243 A | | 3/1994 | Heckman et al. |
| 5,615,268 A | * | 3/1997 | Bisbee et al. ................. 713/176 |
| 5,956,409 A | | 9/1999 | Chan et al. |
| 6,064,751 A | * | 5/2000 | Smithies et al. .............. 382/115 |
| 6,307,955 B1 | | 10/2001 | Zank et al. |
| 6,640,007 B1 | | 10/2003 | Niie et al. |
| 6,779,178 B1 | | 8/2004 | Lloyd et al. |
| 6,826,551 B1 | | 11/2004 | Clary et al. |
| 7,024,562 B1 | | 4/2006 | Flink et al. |
| 7,162,635 B2 | | 1/2007 | Bisbee et al. |
| 7,228,428 B2 | | 6/2007 | Cousins et al. |
| 7,295,339 B2 | | 11/2007 | Kobayashi et al. |
| 7,607,018 B2 | * | 10/2009 | Baxter et al. ................... 713/176 |
| 7,814,049 B2 | * | 10/2010 | Aboukrat et al. ............. 707/608 |
| 2002/0052835 A1 | * | 5/2002 | Toscano .......................... 705/38 |
| 2004/0143543 A1 | * | 7/2004 | Goldman ........................ 705/38 |
| 2005/0138382 A1 | | 6/2005 | Hougaard et al. |

(Continued)

FOREIGN PATENT DOCUMENTS

JP 2004128999 4/2004

OTHER PUBLICATIONS

Topaz Systems, Inc., Electronic Digital Signature Capture and Verification Software, Tablets, and Pads; 1995-2002:1-4. Downloaded: http://topazsystems.com/Software//generalfaq.htm.

*Primary Examiner* — Kambiz Zand
*Assistant Examiner* — Aubrey Wyszynski
(74) *Attorney, Agent, or Firm* — Banner & Witcoff, Ltd.

(57) ABSTRACT

Aspects of the invention include methods and systems for electronically signing a plurality of documents, such as an insurance application, a loan application, a set of mortgage papers, a bank application, or the like. A customer, or multiple customers, electronically submits the signature once and the customer's one signature is applied to all of the areas where the customer signature is required. The electronic signature may include initials and/or a graphical representation of the customer's handwritten signature. Aspects of the invention include an apparatus comprising a display, a memory, and a processor coupled to the memory and programmed with computer-executable instructions that, when executed, perform a method for electronically signing a plurality of documents.

23 Claims, 14 Drawing Sheets

U.S. PATENT DOCUMENTS

2006/0277123 A1  12/2006  Kennedy et al.
2007/0079128 A1*  4/2007  Cheng et al. .................. 713/176
2008/0022111 A1  1/2008  Dietl
2008/0100874 A1  5/2008  Mayer

* cited by examiner

CHOOSE YOUR APPLICATION SUBMISSION METHOD

SELECT THE METHOD YOU WILL USE TO SUBMIT YOUR APPLICATION. AFTER YOU HAVE SELECTED A METHOD FOR SUBMISSION, YOUR APPLICATION WILL BE LOCKED.

SUBMIT WITH ELECTRONIC SIGNATURE
- APPLICATIONS ARE SENT ELECTRONICALLY TO ALLSTATE FINANCIAL; NO NEED TO PRINT AND FAX IN APPLICATIONS
- CUSTOMERS WILL SIGN APPLICATIONS WITH AN ELECTRONIC SIGNATURE PAD
- THIS METHOD REQUIRED A COMPANY ELECTRONIC SIGNATURE PAD. TEST YOUR SIGNATURE PAD NOW.

[SUBMIT WITH ELECTRONIC SIGNATURE] — 302

SUBMIT APPLICATION BY FAX
- APPLICATION FORMS ARE GENERATED AND PRINTED
- CUSTOMERS WILL SIGN PAPER APPLICATIONS WITH A PEN
- SIGNED APPLICATIONS ARE FAXED TO INSURANCE COMPANY
- NO ADDITIONAL EQUIPMENT REQUIRED

[SUBMIT APPLICATION BY FAX] — 304

[< BACK]  [SAVE & CLOSE]

App ON-LINE — 250
- POLICY INFORMATION
- PRIMARY INSURED
- OWNER/PAYOR
- ADDITIONAL/JOINT INSURED
- CHILDREN INSURED
- BENEFICIARIES
- HEALTH INFORMATION
- OTHER INSURANCE
- PAYMENT INFORMATION
- AGENT REMARKS
- AGENT REPORT
- SUBMISSION METHOD

FIG. 3

INDICATE YOUR CONSENT TO USE ELECTRONIC SIGNATURE

EACH SIGNATORY MUST AGREE TO THE CONDITIONS LISTED IN ORDER TO SUBMIT THIS APPLICATION USING ELECTRONIC SIGNATURE.

☐ OWNER/PRIMARY INSURED: CUSTOMER 1

IN COMPLETING YOUR APPLICATION FOR INSURANCE, ELECTRONIC DOCUMENTS AND ELECTRONIC SIGNATURES MAY BE UTILIZED IN THIS PROCESS. YOU WILL BE PROVIDED WITH CUSTOMER COPIES AND HAVE A RIGHT TO REQUEST AND RECEIVE A PRINTED COPY OF ANY ELECTRONIC DOCUMENT YOU SIGN. DO YOU CONSENT TO THE USE OF SUCH ELECTRONIC DOCUMENTS AND ELECTRONIC SIGNATURES IN THE COMPLETION OF YOUR APPLICATION?

NOTE: YOUR SIGNATURES/INITIALS WILL NOT BE USED FOR ANY OTHER PURPOSE THAN ON THE REQUIRED FORMS.

SELECT ONE:
○ I CONSENT TO USE ELECTRONIC SIGNATURE.
○ I DO NOT CONSENT TO USE ELECTRONIC SIGNATURE.

[ < BACK ]  [ SAVE & CLOSE ]  [ NEXT > ]

App ON-LINE
- POLICY INFORMATION
- PRIMARY INSURED
- OWNER/PAYOR
- ADDITIONAL/JOINT INSURED
- CHILDREN INSURED
- BENEFICIARIES
- HEALTH INFORMATION
- OTHER INSURANCE
- PAYMENT INFORMATION
- AGENT REMARKS
- AGENT REPORT

■ SUBMISSION METHOD

■ E-SIGNATURE
- CONSENT
  - OWNER
  - PRIMARY INSURED
- VIEW & SIGN FORMS
  - OWNER
  - PRIMARY INSURED
  - AGENT
- SUBMIT

■ YOUR HELP
▲ TEST SIGNATURE PAD
▲ SUBMIT APPLICATION BY FAX
▲ UNLOCK APPLICATION
▲ LRN
▲ FAQs

*FIG. 4*

VIEW & SIGN FORMS

ELECTRONIC SIGNATURES CAN ONLY BE COLLECTED AFTER A PERSON VIEWS ALL FORMS REQUIRING THAT PERSON'S SIGNATURE. CLICK ON A FORM NAME IN THE TABLE BELOW TO OPEN THE PDF FILE IN A SEPARATE VIEWER.

| FORM # | FORM NAME | SIGNATURES REQUIRED | FORM STATUS |
|---|---|---|---|
| 1. FAA73 | APPLICATION FOR LIFE INSURANCE | CUSTOMER 1, AGENT | NOT VIEWED |
| 2. FAA73RPT | AGENT REPORT | AGENT | NOT VIEWED |
| 3. FAA73HPA-1 | RELEASE OF HEALTH-RELATED INFO | CUSTOMER 1, CUSTOMER 2 | NOT VIEWED |
| 4. LBL1019MO | CONSENT FOR TESTING | CUSTOMER 1 | NOT VIEWED |
| 5. LBL-MO | REPLACEMENT NOTICE | CUSTOMER 1, AGENT | NOT VIEWED |
| 6. LBL842-3 | ACCEPTANCE OF ASSIGNMENT | CUSTOMER 1, CUSTOMER 2 | NOT VIEWED |
| 7. LBL1019MO | CONSENT FOR TESTING | N/A | N/A |

COLLECT SIGNATURES

AFTER A PERSON VIEWS THE APPROPRIATE FORMS REQUIRING THAT PERSON'S SIGNATURE, THE 'SIGN FORMS' BUTTON WILL BECOME ACTIVE. CLICK "SIGN FORMS" TO COLLECT SIGNATURES USING YOUR ELECTRONIC SIGNATURE PAD. YOU MAY ALSO TEST YOUR SIGNATURE PAD NOW.

☐ OWNER/PRIMARY INSURED: CUSTOMER 1
WHEN YOU HAVE VIEWED ALL THE REQUIRED FORMS AND ARE READY TO APPLY YOUR SIGNATURE, CLICK THE BUTTON BELOW TO BEGIN THE SIGNATURE COLLECTION PROCESS.

[ SIGN FORMS ]  STATUS: FORMS NOT SIGNED

☐ AGENT: AGENT
WHEN YOU HAVE VIEWED ALL THE REQUIRED FORMS AND ARE READY TO APPLY YOUR SIGNATURE, CLICK THE BUTTON BELOW TO BEGIN THE SIGNATURE COLLECTION PROCESS.
NOTE: THE AGENT'S SIGNATURE CAN ONLY BE CAPTURED AFTER ALL OTHER SIGNATURES HAVE ALREADY BEEN CAPTURED.

[ SIGN FORMS ]  STATUS: FORMS NOT SIGNED

[ < BACK ]  [ SAVE & CLOSE ]  [ NEXT > ]

---

■ App ON-LINE
▫ POLICY INFORMATION
▫ PRIMARY INSURED
▫ OWNER/PAYOR
▫ ADDITIONAL/JOINT INSURED
▫ CHILDREN INSURED
▫ BENEFICIARIES
▫ HEALTH INFORMATION
▫ OTHER INSURANCE
▫ PAYMENT INFORMATION
▫ AGENT REMARKS
▫ AGENT REPORT
▫ SUBMISSION METHOD

■ E-SIGNATURE
▫ CONSENT
  ▫ OWNER
  ▫ PRIMARY INSURED
▫ VIEW & SIGN FORMS
  ▫ OWNER
  ▫ PRIMARY INSURED
  ▫ AGENT
▪ SUBMIT

■ YOUR HELP
▲ TEST SIGNATURE PAD
▲ SUBMIT APPLICATION BY FAX
▲ UNLOCK APPLICATION
▲ LRN
▲ FAQs

Figure 6A:
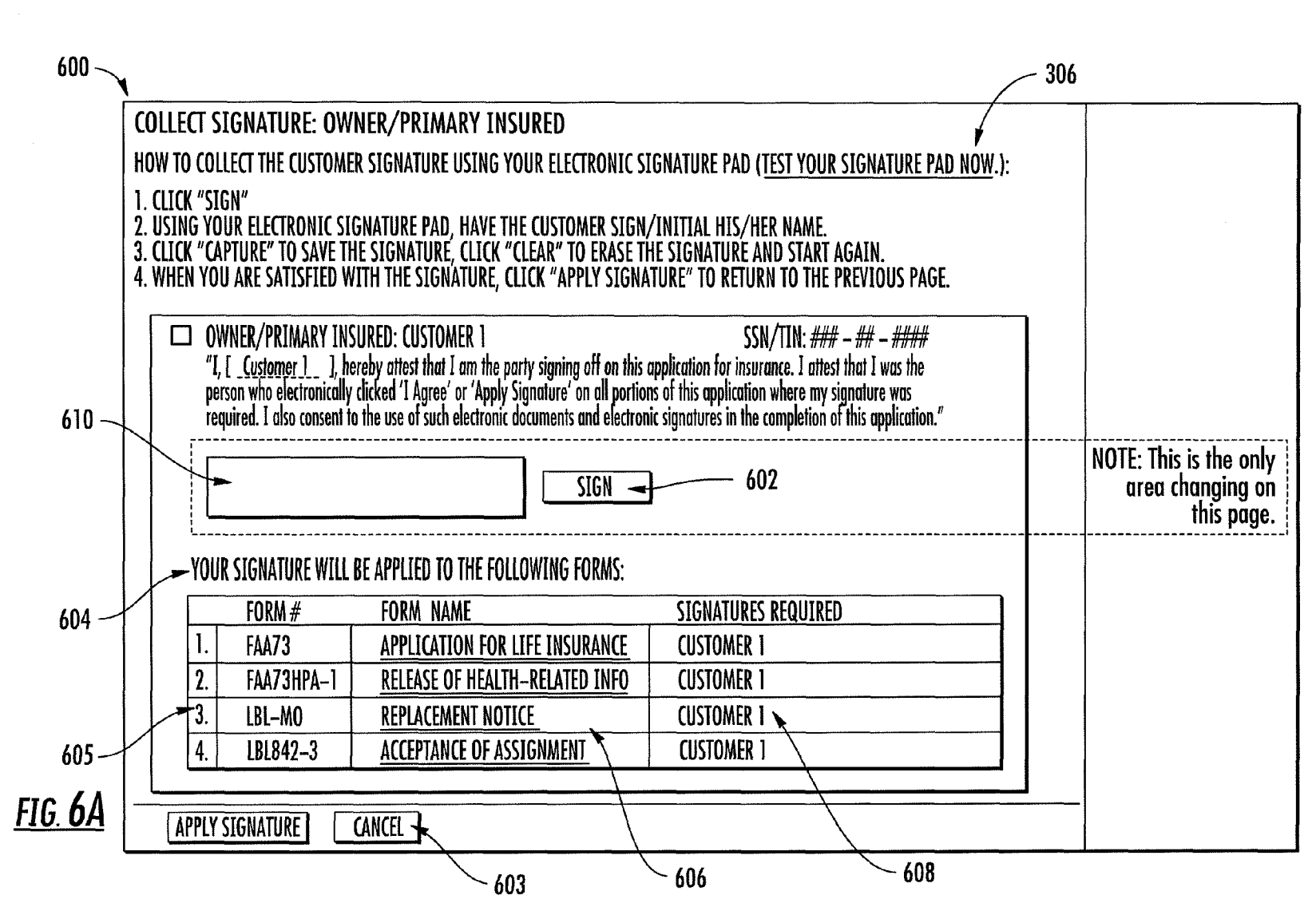

COLLECT SIGNATURE: OWNER/PRIMARY INSURED

HOW TO COLLECT THE CUSTOMER SIGNATURE USING YOUR ELECTRONIC SIGNATURE PAD (TEST YOUR SIGNATURE PAD NOW.):

1. CLICK "SIGN"
2. USING YOUR ELECTRONIC SIGNATURE PAD, HAVE THE CUSTOMER SIGN/INITIAL HIS/HER NAME.
3. CLICK "CAPTURE" TO SAVE THE SIGNATURE, CLICK "CLEAR" TO ERASE THE SIGNATURE AND START AGAIN.
4. WHEN YOU ARE SATISFIED WITH THE SIGNATURE, CLICK "APPLY SIGNATURE" TO RETURN TO THE PREVIOUS PAGE.

☐ OWNER/PRIMARY INSURED: CUSTOMER 1      SSN/TIN: ### - ## - ####

"I, [ _Customer 1_ ], hereby attest that I am the party signing off on this application for insurance. I attest that I was the person who electronically clicked 'I Agree' or 'Apply Signature' on all portions of this application where my signature was required. I also consent to the use of such electronic documents and electronic signatures in the completion of this application."

[ SIGN ]

NOTE: This is the only area changing on this page.

YOUR SIGNATURE WILL BE APPLIED TO THE FOLLOWING FORMS:

| | FORM # | FORM NAME | SIGNATURES REQUIRED |
|---|---|---|---|
| 1. | FAA73 | APPLICATION FOR LIFE INSURANCE | CUSTOMER 1 |
| 2. | FAA73HPA-1 | RELEASE OF HEALTH-RELATED INFO | CUSTOMER 1 |
| 3. | LBL-MO | REPLACEMENT NOTICE | CUSTOMER 1 |
| 4. | LBL842-3 | ACCEPTANCE OF ASSIGNMENT | CUSTOMER 1 |

[ APPLY SIGNATURE ]   [ CANCEL ]

COLLECT SIGNATURE: OWNER/PRIMARY INSURED

HOW TO COLLECT THE CUSTOMER SIGNATURE USING YOUR ELECTRONIC SIGNATURE PAD (TEST YOUR SIGNATURE PAD NOW.):

1. CLICK "SIGN"
2. USING YOUR ELECTRONIC SIGNATURE PAD, HAVE THE CUSTOMER SIGN/INITIAL HIS/HER NAME.
3. CLICK "CAPTURE" TO SAVE THE SIGNATURE. CLICK "CLEAR" TO ERASE THE SIGNATURE AND START AGAIN.
4. WHEN YOU ARE SATISFIED WITH THE SIGNATURE, CLICK "APPLY SIGNATURE" TO RETURN TO THE PREVIOUS PAGE.

☐ OWNER/PRIMARY INSURED: CUSTOMER 1       SSN/TIN: ###-##-####

"I, [ Customer 1 ], hereby attest that I am the party signing off on this application for insurance. I attest that I was the person who electronically clicked 'I Agree' or 'Apply Signature' on all portions of this application where my signature was required. I also consent to the use of such electronic documents and electronic signatures in the completion of this application."

[ CAPTURE ] ← 612

NOTE: This is the only area changing on this page.

YOUR SIGNATURE WILL BE APPLIED TO THE FOLLOWING FORMS:

| | FORM # | FORM NAME | SIGNATURES REQUIRED |
|---|---|---|---|
| 1. | FAA73 | APPLICATION FOR LIFE INSURANCE | CUSTOMER 1 |
| 2. | FAA73HPA-1 | RELEASE OF HEALTH-RELATED INFO | CUSTOMER 1 |
| 3. | LBL-MO | REPLACEMENT NOTICE | CUSTOMER 1 |
| 4. | LBL842-3 | ACCEPTANCE OF ASSIGNMENT | CUSTOMER 1 |

[ APPLY SIGNATURE ]  [ CANCEL ] ← 603

*FIG. 6B*

COLLECT SIGNATURE: OWNER/PRIMARY INSURED

HOW TO COLLECT THE CUSTOMER SIGNATURE USING YOUR ELECTRONIC SIGNATURE PAD (TEST YOUR SIGNATURE PAD NOW.):

1. CLICK "SIGN"
2. USING YOUR ELECTRONIC SIGNATURE PAD, HAVE THE CUSTOMER SIGN/INITIAL HIS/HER NAME.
3. CLICK "CAPTURE" TO SAVE THE SIGNATURE. CLICK "CLEAR" TO ERASE THE SIGNATURE AND START AGAIN.
4. WHEN YOU ARE SATISFIED WITH THE SIGNATURE, CLICK "APPLY SIGNATURE" TO RETURN TO THE PREVIOUS PAGE.

☐ OWNER/PRIMARY INSURED: CUSTOMER 1   SSN/TIN: ### - ## - ####

"I, [ Customer 1 ], hereby attest that I am the party signing off on this application for insurance. I attest that I was the person who electronically clicked 'I Agree' or 'Apply Signature' on all portions of this application where my signature was required. I also consent to the use of such electronic documents and electronic signatures in the completion of this application."

*CUSTOMER 1*      CLEAR

NOTE: This is the only area changing on this page.

YOUR SIGNATURE WILL BE APPLIED TO THE FOLLOWING FORMS:

| | FORM # | FORM NAME | SIGNATURES REQUIRED |
|---|---|---|---|
| 1. | FAA73 | APPLICATION FOR LIFE INSURANCE | CUSTOMER 1 |
| 2. | FAA73HPA-1 | RELEASE OF HEALTH-RELATED INFO | CUSTOMER 1 |
| 3. | LBL-MO | REPLACEMENT NOTICE | CUSTOMER 1 |
| 4. | LBL842-3 | ACCEPTANCE OF ASSIGNMENT | CUSTOMER 1 |

APPLY SIGNATURE   CANCEL

FIG. 6C

App ON-LINE
- POLICY INFORMATION
- PRIMARY INSURED
- OWNER/PAYOR
- ADDITIONAL/JOINT INSURED
- CHILDREN INSURED
- BENEFICIARIES
- HEALTH INFORMATION
- OTHER INSURANCE
- PAYMENT INFORMATION
- AGENT REMARKS
- AGENT REPORT
- SUBMISSION METHOD

E-SIGNATURE
- CONSENT
  - OWNER
  - PRIMARY INSURED
- VIEW & SIGN FORMS
  - OWNER
  - PRIMARY INSURED
  - AGENT
- SUBMIT

— 250

800 —

SUBMIT THE APPLICATION
READ THE STATEMENTS BELOW AND CHECK THE BOX BELOW IF YOU AGREE. IF YOU DO NOT AGREE WITH THE STATEMENT BELOW, YOU WILL NOT BE ABLE TO SUBMIT YOUR APPLICATION. WHEN YOU ARE FINISHED, PRESS SUBMIT TO SEND YOUR APPLICATION & SIGNATURES TO INSURANCE COMPANY.

802 —

By clicking Submit, I hereby represent and attest to
Insurance Company
and their affiliates (collectively "INCO") that I have provided all disclosures and notices to the applicant(s) as required by INCO I have completely reviewed the application and each form with applicant(s) and any other signing parties. I further attest that each party signed on their own behalf and applied their own signature to the application and related forms. I further represent and attest that I have complied with INCO requirements regarding replacements, where applicable, and have inquired as to whether the applicant(s) have any existing annuity or life insurance policy and/or whether or not the policy being applied for will replace or change any existing annuity or life insurance or annuities.

804 — ☑ I AGREE with the statements above

WARNING: YOU WILL NOT BE ABLE TO MAKE ANY CHANGES TO YOUR APPLICATION ONCE SUBMIT HAS BEEN CLICKED.

[< BACK]   [SAVE & CLOSE]   [SUBMIT >]
                    808 —         806 —

*FIG. 8*

App ON-LINE
- POLICY INFORMATION
- PRIMARY INSURED
- OWNER/PAYOR
- ADDITIONAL/JOINT INSURED
- CHILDREN INSURED
- BENEFICIARIES
- HEALTH INFORMATION
- OTHER INSURANCE
- PAYMENT INFORMATION
- AGENT REMARKS
- AGENT REPORT

SUBMISSION METHOD

E-SIGNATURE
- CONSENT
- OWNER
- PRIMARY INSURED
- VIEW & SIGN FORMS
- OWNER
- PRIMARY INSURED
- AGENT
- SUBMIT

Confirmation
Thank you for submitting your App On-Line application using Electronic Signature. Your application should be processed in the next X to Y business days and will appear in pending policies page of Insurance Company within ZZ hours. Please print the entire application as you are responsible for ensuring customers receive the appropriate copies.

[VIEW & PRINT SUBMITTED APPLICATION]    [NEXT]

FIG. 9

ONE-TO-MANY ELECTRONIC SIGNATURE PROCESS

RELATED APPLICATION

The present application claims the benefit of U.S. Provisional Patent Application No. 61/083,580, filed on Jul. 25, 2008, which application is incorporated by reference herein and made a part hereof.

FIELD OF THE INVENTION

The invention relates generally to electronic signatures. More specifically, the invention provides methods and systems for electronically signing a plurality of documents, such as an insurance application, a loan application, a set of mortgage papers, a bank application, or the like. A customer electronically signs his or her signature once and the one captured signature is applied to all of the areas where the customer signature is required.

BACKGROUND

Currently, when a customer is filling out an insurance application or signing a set of mortgage papers, the customer will have to sign his or her name many different times on many different forms in order to complete the application or mortgage process. Also, with technological advances the application process is becoming more of an online process, as opposed to a paper process. However, the signature process is still primarily completed on paper, which is known as a wet signature. Electronic signatures are known in the art and are currently being used with credit card purchases and other one-time signature methods.

The current online application process is normally completed by the insurance agent with the help of the customer. Once the online application is completed, the agent then generates the required forms along with a fax cover sheet with a barcode. The generated online application is generally in PDF or other electronic paper format. The agent then prints off the PDF version of the application for the customer to wet sign. The agent obtains all the required wet signatures from the customer. This process can require a number of wet signatures by a single customer as well as multiple signatures from multiple customers. The customer may also need to wet initial many different areas in order to meet the application requirements.

Once the agent has the wet signatures, the agent indicates through the system that the wet signatures are in hand and acknowledges the legal agreement online. The agent will then initiate the submission action to start the data collection feed. Following the submission of the application online, the agent then faxes the fully wet signed application forms with the fax data cover sheet. The cover sheet is normally required to be faxed along with the online application forms in order to provide a tracking mechanism for the company and agent.

This same current process as described above can be very similar for other processes which require multiple forms and multiple signatures for completion, such as a mortgage application, bank application, loan application, or other more complicated financial transactions.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for providing a one-to-many electronic signature process.

A first aspect of the invention provides a method of electronically signing a plurality of documents. The method comprises a step of receiving the plurality of documents ready for signature by a customer and an additional step of displaying the plurality of documents to the customer for review. The method comprises a step of receiving an approval by the customer to electronically sign the plurality of documents. The method further includes collecting an electronic signature from the customer. The method finally includes applying the electronic signature to the plurality of documents.

A second aspect of the invention further includes the above described aspect of the method of electronically signing a plurality of documents, wherein the plurality of documents may comprise an insurance application or a set of mortgage papers.

In another aspect of the invention, the electronic signature may include a graphical representation of the customer's handwritten (wet) signature. The electronic signature may also comprise initials.

An additional aspect of the invention further includes the above described aspect of the method of electronically signing a plurality of documents, wherein the method further comprises the step of collecting an electronic signature from an agent and applying the agent's signature to one or more of the plurality of documents. Also, the method may further comprise the step of collecting an electronic signature from a second customer and applying the second customer's electronic signature to one or more of the plurality of documents. There may be any number of customers who need to sign one or more of the plurality of documents, which may be any number of one or more customers.

An additional embodiment of the invention provides a method of electronically signing an insurance application. The method of electronically signing an insurance application comprises the steps of: receiving the insurance application, displaying the insurance application to a customer for review, collecting an electronic signature from the customer, receiving an approval by the customer to electronically sign the insurance application, applying the customer's electronic signature to each of the signature areas for the customer on the insurance application, collecting an electronic signature from the agent, applying the agent's electronic signature to each of the signature areas for the agent on the insurance application, and submitting the insurance application. The insurance application should be completed and ready for signature by the customer. Also, the insurance application includes a plurality of forms with a plurality of signatures for the customer and the agent. The electronic signature includes a graphical representation of the customer's handwritten signature. The electronic signature may also include initials.

Another embodiment of the invention provides an apparatus including a display, a memory, and a processor coupled to the memory and programmed with computer-executable instructions for performing a method that includes receiving a plurality of documents ready for signature by a customer, displaying the plurality of documents for review, collecting an electronic signature from the customer, receiving an approval by the customer to electronically sign the plurality of documents, and applying the customer's electronic signature to the plurality of documents.

An additional aspect of the invention provides an apparatus including a display, a memory, and a processor coupled to the memory and programmed with computer-executable instructions for performing a method including receiving the insurance application, displaying the insurance application to a customer for review, collecting an electronic signature from the customer, receiving an approval by the customer to electronically sign the insurance application, applying the customer's electronic signature to each of the signature areas for the customer on the insurance application, collecting an electronic signature from the agent, applying the agent's electronic signature to each of the signature areas for the agent on the insurance application, and submitting the insurance application.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 3-9 show illustrative screen shots according to one or more illustrative aspects of the invention;

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
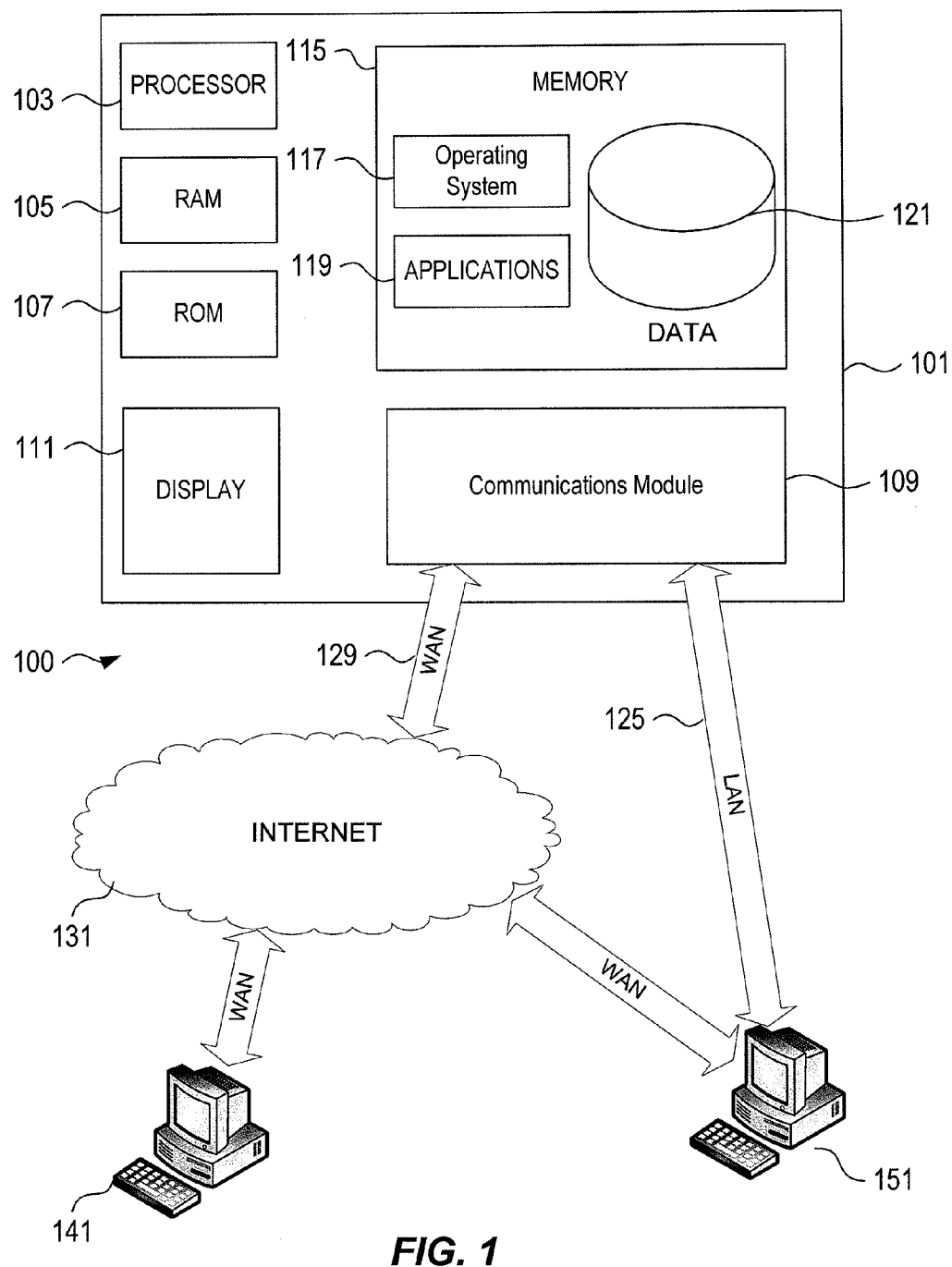
FIG. 1 depicts an operating environment for implementing one or more illustrative aspects of the invention.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, automated teller machines (ATMs), distributed computing environments that include any of the above systems or devices, and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by the computing device 101. The media may include both volatile and nonvolatile media, and/or removable and non-removable media. By way of example, and not limitation, computer readable media may comprise computer storage media and communication media. Computer storage media include volatile and nonvolatile, and/or removable and non-removable media implemented in any method or technology for storage of information such as computer readable instructions, data structures, program modules or other data. Computer storage media may include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embody computer readable instructions, data structures, program modules or other data in a modulated data signal such as a carrier wave or other transport mechanism and include any information delivery media. The modulated data signal is a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media. Although not shown, RAM 105 may include one or more applications representing the application data stored in RAM memory 105 while the computing device is on and corresponding software applications (e.g., software tasks), are running on the computing device 101.

Communications module 109 may include a microphone, keypad, touch screen, signature pad and/or stylus through which a user of computing device 101 may provide input, and may also include one or more of a speaker for providing audio output and a video display device 111 for providing textual, audiovisual and/or graphical output. The communications module 109 may include multiple devices to provide input to the computing device 101. Software may be stored within the memory 115 in order to provide instructions to the processor 103 for enabling the computing device 101 to perform various functions. For example, the memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 may provide centralized storage of account information and account holder or customer information for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

One-To-Many Electronic Signature Process

Generally, aspects of the one-to-many electronic signature process improve efficiency and quality of document signing processes between a customer and an agent. "One-to-many" refers to a concept that one electronic signature is obtained from or required by the customer or agent and then this electronic signature is used with or applied to many documents or forms in order to complete the electronic signature process. Aspects of the inventive electronic signature processes reduce the time of the signing of documents, while also minimizing the number of errors during the signature process. As used herein, an electronic signature may include an electronic representation of a person's handwritten (wet) signature, or may include any other legally acceptable electronic signature. Documents, as referred to throughout this application, may include a set of multiple forms or applications, which may require multiple signatures. The one-to-many electronic signature process may apply to documents which may include insurance applications, mortgage applications or papers, home equity applications, bank applications, car loan applications, or other complex financial application processes. Additionally, there may be various roles within the one-to-many electronic signature process. The agent, who may also be referred to as a producer, or manager, is the person who meets with the customers, collects the data, and generally fills out the documents for the customers. The customer is any person (other than the agent) who needs to sign the documents. The customer could be the primary person, but the customer may also include a beneficiary or a secondary loan signer or the like.

Figure 2A:
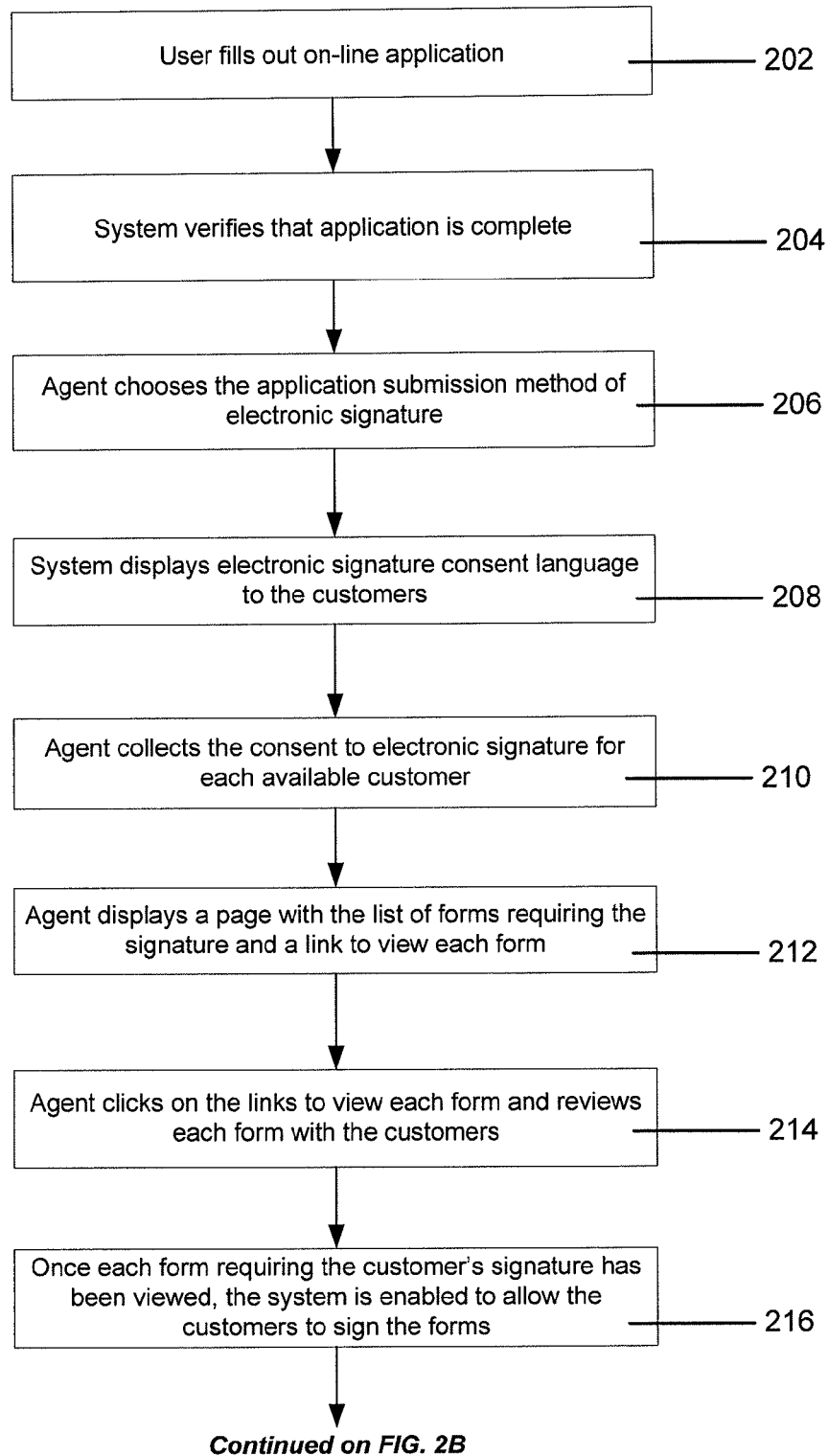
FIGS. 2A and 2B depict an illustrative flowchart of a method for implementing one or more illustrative aspects of the invention.
Figure 2B:
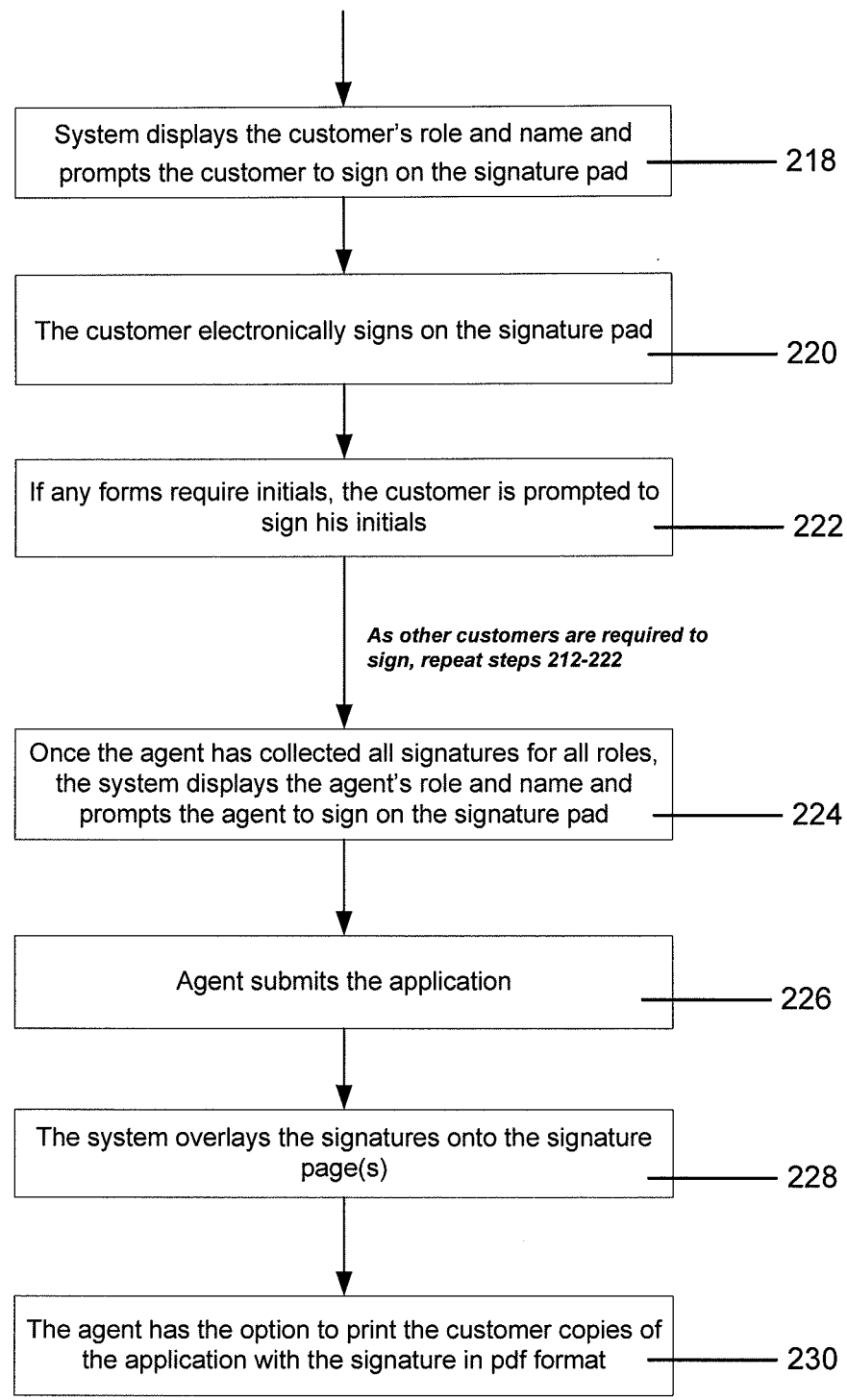

FIGS. 2A and 2B depict an illustrative method for the one-to-many electronic signature process. The method of FIGS. 2A and 2B will be described further in the following illustrative embodiment using an insurance application as the illustrative document.

In one embodiment of the present invention, in a first step 202, a user fills out the on-line application. This may be performed by the agent or the customer, or both, depending or based on any restrictions put in place by a corporate or governmental entity. Also, the customer may fill out the application on-line or portions of the application on-line and submit this to the agent over a network, such as the interne. Following this step, including any iterations of this step to complete any missing information, the application is completed and ready for signatures.

In a next step 204, the system, or computing device 101, verifies that the application has been completed adequately. The system then may allow the user to proceed with the process by enabling the electronic signature submission method. Optionally, an agent might choose a type of application to be completed, where multiple types of applications might be offered.

In a next step 206, the user chooses the application submission method of electronic signature. If the agent or customer is not prepared to submit the application with electronic signature, the user may select to submit the application by fax with the manual signatures as is currently performed. Also with this step, the agent and/or customer may be reminded that these applications may be sent electronically to the financial institution with no requirement to print and fax the applications. The agent and customer may also be reminded that the customers sign the applications with an electronic signature pad and that a signature pad that has been approved for operation with the financial institution is required. The agent may test the signature pad to ensure that the signature pad has been approved for operations with the financial institution and to verify the signature pad is working properly. Approval may be based on interoperable communications protocols, sufficient security standards, and the like.

In a next step 208, the system displays electronic signature consent language to the customer or customers. The consent language operates as the customer's authorization to apply a singly inputted electronic signature to the multiple signature instances for that user in the set of documents. In addition, if the customer has more than one role in the transaction (e.g., borrower, beneficiary, guarantor, etc.), the customer's roles may be combined and only one consent section might be displayed for each customer. The agent may or may not need to consent to each transaction. Optionally, the agent may read the consent language to the customer(s) or allow the customer to read it on the display. Illustrative consent language (for an insurance application, in this example) might include the following: "In completing your application for insurance, electronic documents and electronic signatures may be utilized in this process. You will be provided with customer copies and have a right to request and receive a printed copy of any electronic document you sign. Do you consent to the use of such electronic documents and electronic signatures in the completion of your application? NOTE: Your signatures/ initials will not be used for any purpose other than on the required forms." Bold-faced type may be used as applicable.

In a next step 210, the agent collects the consent to electronic signature for each applicable person in the signature process. Each customer signing the application must agree to the conditions listed in order to submit the application using electronic signature. The customer may be given the option of selecting either: "I CONSENT to use Electronic Signature" or "I DO NOT CONSENT to use Electronic Signature." Each customer indicates whether or not the customer will consent to sign electronically. The customer may only have to indicate consent once, even if the customer has more than one role on the application (e.g., owner and primary insured, beneficiary, etc.). The process may require the customer to actually click the consent indicator and not allow the agent to perform this for the customer. Alternatively, the customer might sign a paper document with a wet signature indicating consent to electronic signatures.

Following the electronic signature consent, in a step 212, the agent displays a listing of the forms that require the customer's signature with a link to view each form. All forms generated for the application should be available for the customer to view, whether or not the form requires a signature. Next to each form, there may be a column which lists whose signatures are required for each form, optionally also indicating the role of each person signing the document. This column may include the customer, the agent, or any of the other customers or third parties (e.g., parent/legal guardian(s), spouse of owner of policy being replaced, and witness) that may be required to sign each form. Also, initially, there may be a status indicator next to each form stating that the form has not been viewed. The status indicator may change throughout the process from "Not Viewed" to "Viewed" to "Signed." The electronic signature may be collected after the customer has viewed all forms that require that person's signature, thereby ensuring that the customer is aware of all of the documents to which his signature will be applied.

In the next step 214, the agent or customer may click on a form type/name in order to open the PDF file in a separate viewer. The system may display the form with the customer data in a new window. The system may print "VOID", "DRAFT", or "VOID-DRAFT", or the like, in a policy number box on each form. The agent may review the form with the customer to ensure that the customer understands the form and answers any questions the customer has about the form. For the lines where the signatures are required, a "Signature to be applied here" may be inserted on the line for the form that is reviewed. Once the form has been viewed, the indicator next to the form may now display that the form has been viewed. The agent and customer repeat this process for each form that requires the customer's signature.

In step 216, once the agent and customer have viewed all of the forms where signature is required for a specific customer and that customer has consented to electronic signature, the system may enable that specific customer to collect an electronic signature. However, even if the agent views all the forms where the agent's signature is required, the system might not allow the agent to sign until all customer signatures have been collected.

In step 218, the agent may initiate the process to collect a customer's electronic signature. On the Collect Signature page, the system may allow the agent or customer the ability to view forms on this page; however, this is primarily for convenience and might not be a requirement to signing. Those forms that require the customer's signature may be listed following the illustrative terminology: "Your signature will be applied to the following forms." The agent may review the signature language with the customer. Following the review of the signature language, the agent and customer are ready to electronically sign the application. Illustrative signature language might include "I, [Customer], hereby attest that I am the party signing off on this application for insurance. I attest that I was the person who electronically clicked 'I Agree' or 'Apply Signature' on all portions of this application where my signature was required. I also consent to the use of such electronic documents and electronic signatures in the completion of this application."

In step 220, in order to electronically collect the signature, the customer or agent may click the "Sign" button. Then, using the electronic signature pad, the customer may sign his or her name by applying a signature imprint on the signature pad, where the imprint may be made with a stylus or other pen-like instrument and may represent the customer's signature or initials. Following the customer's signature, the customer may select another button, such as "Capture," in order to save the signature. The customer also has the ability to select a button such as "Cancel" or "Clear" in order to erase the signature and start again. When the customer and/or agent are satisfied with the signature, the agent or customer will select a button such as, "Apply Signature" to apply the signature to each of the forms and to return to the previous page. When the signature has been captured and applied, a status may appear for the signature indicating that the signature has been collected on a specific date. Additionally, the signature pad may be communicatively connected to the system in order to send the captured imprint or signature.

In the next step 222, the same steps as described for 220 may occur, except that the customer or agent may enter their initials instead of their signature. Also, those forms that require initials only may be listed following the illustrative terminology: "Your initials will be applied to the following forms."

For each customer that is required to sign the application, steps 212-222 may be repeated in order to allow the second (or third, or fourth, etc.) customer to consent to electronic signature, view all the required forms, and capture the electronic signature. If a witness signature is required, the system may disable the witness' signing functionality until all other customers have signed. Then, the witness will follow steps 212-222 to consent to electronic signature, view the required forms, and capture the electronic signature or initials.

Once the agent has collected a signature for each customer, including the witness (if applicable or required), and the agent has viewed all of the agent's required forms, the system allows the agent to sign, if needed. In step 224, the system displays the agent's role and name and prompts the agent to sign on the signature pad. In order to electronically collect the agent's signature, the agent may click the "Sign" button. Then, using the electronic signature pad, the agent may sign his or her name. Following the agent's signature, the agent may select another button, such as "Capture" in order to save the signature. The agent also has the ability to select a button such as "Cancel" or "Clear" in order to erase the signature and start again. When the agent is satisfied with the signature, the agent will select a button such as, "Apply Signature" to apply the agent's signature to each of the forms on which the agent is to sign and to return to the previous page. When the signature has been captured and applied, a status may appear for the signature indicating that the signature has been collected on a specific date.

Once all required signatures are collected, in step 226, the system allows the agent to submit the application. The agent may be required to agree to a statement prior to submitting the application. The "submit" functionality might not be enabled until the agent agrees to the statement. An illustrative statement may include "By clicking Submit, I hereby represent and attest to [financial institution] that I have provided all disclosures and notices to the applicant(s) as required by [financial institution]. I have completely reviewed the application and each form with the applicants(s) and any other signing parties. I further attest that each party signed on their own behalf and applied their own signature to the application and related forms."

Figure 10:
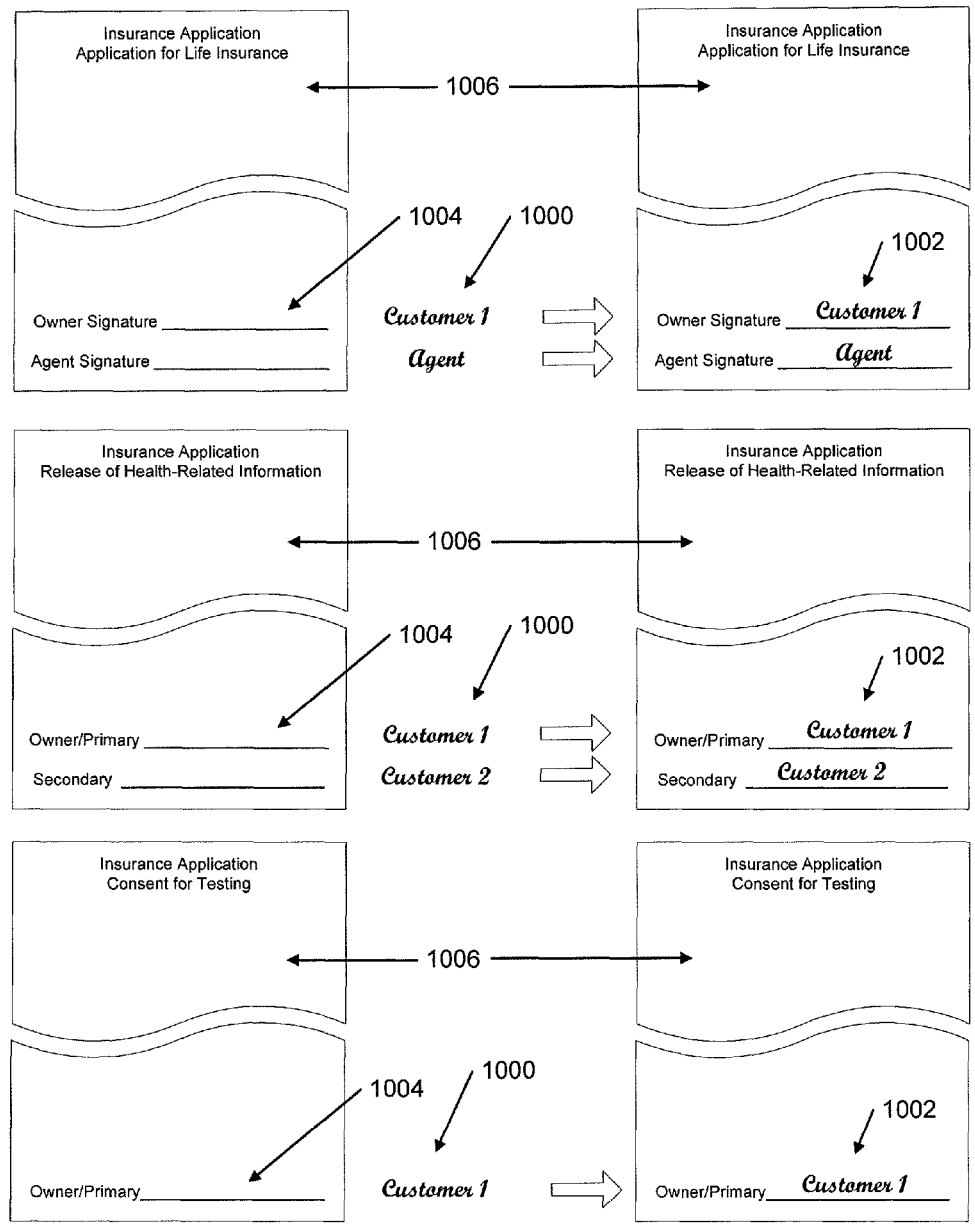
FIG. 10 depicts the electronic signature process of overlaying the signature onto the form according to one or more illustrative aspects of the invention.

The agent then may submit the application. FIG. 10 depicts an illustrative example of a customer's handwritten signature 1000 overlaid as an electronic signature 1002 onto a blank signature area 1004 on the plurality of forms 1006 as described herein. Following the submission of the application, in step 228, the system overlays the electronic signatures 1002 onto the required forms 1006. During step 228, the electronic signature 1002 may include a graphical representation of the customer's handwritten signature 1000 from the signature pad in step 220. The graphical representation of the customer's handwritten signature 1000 may be in any of a variety of formats (e.g., .pdf, .tif, .png, or .jpg or other similar file) which can be overlaid onto the signature area 1004 of the required signature forms 1006. For example, any file format that supports alpha transparency may be used, or any other format that allows a graphical image to be overlaid on top of a preexisting document. The system may automatically prefill the date field on each of the signature pages and areas. The system may also insert a policy number for each of the forms for the application. The system may then permanently lock the application and all signatures. Permanently locking the application may mean that the agent can no longer modify any of the consent and/or signatures that were collected, nor can the agent unlock the application or opt out to a regular signature. Also, the forms that can be viewed are now the final forms with signatures, dates, and a policy number. After the signatures 1002 have been overlaid onto the required forms 1006, the system may delete the electronic signatures 1002 that were collected and stored. The system may perform this deletion for security reasons in order to prevent fraud or signature piracy (i.e., to prevent someone from applying a captured signature 1002 to any other documents).

In the final step 230, the agent is able to view and print the application forms that were submitted. The system prints the customer copies of the application with the signature in PDF or similar format, or to paper for physical storage.

Some steps in the aforementioned process may be optional, while others may be further divided into further substeps than described above. In addition, various steps may be performed in other than their recited order where a previous step is not required to perform another step.

Illustrative Business Rules Associated with the Process

The following is a table of sample business rules that may be used with the electronic signature process. Any of these business rules may be used for the electronic signature process, from none to all of them. Also, these business rules may be changed or modified depending on the business needs and the needs for the electronic signature process.

| Rule # | Business Rule Description | Related Step Number from FIGS. 2A & 2B |
|---|---|---|
| 1 | Request consent to electronic signature prior to collecting signatures on application forms. | 208 |
| 2 | Electronic signature consent can be collected once per person (not once per role). | 210 |
| 3 | Electronic signature consent can be collected by clicking instead of signing. | 210 |
| 4 | Screen must display the role and name of the person signing. | 218 |
| 5 | Do not allow submission until customer copies are rendered. | 224 |
| 6 | Provide the option to print the entire application package with signatures. | 230 |
| 7 | Provide the ability to save forms as incomplete (some signatures obtained, some outstanding). | Any step |
| 8 | Provide the ability for each customer to sign once and apply to all forms. | 220 |
| 9 | Signatures can be collected once per person (not once per role). | 220-230 |
| 10 | Request a final authorization for both customers and agent indicating the party applied his own signatures. | 226 |
| 11 | Print some text in the policy number box of each "draft" form indicating that the forms are not final and should not be sent to the financial institution. | 214 |
| 12 | If any insured (primary or additional/joint) is younger than 18 but older than 14, request both the insured's signature and a parent/legal guardian signature. | 218 |
| 13 | If any insured (primary or additional/joint) is younger than 15, request only the parent/legal guardian's signature. The insured is not required to sign. | 218 |
| 14 | Ensure the agent signs last. | 224 |
| 15 | Ensure the witness signs after all other customers but prior to the agent to ensure that the witness views the customer signatures. | 220 |
| 16 | Only allow three minor insureds for electronic signature. If there are four minor insureds, do not allow the agent to use electronic signature. | 206 |
| 17 | Once the application packet with signatures is generated, the application should be locked. The agent should not be able to change data or re-collect signatures. | 228 |
| 18 | The agent might also consent to electronic signature. | 210 |
| 19 | Signatures can only be reduced to 60% of the original size. | 228 |
| 20 | In certain scenarios, a party to the application can be an entity. The system should collect consent and signature/initials from parties that are both entities and individuals. | 210, 220 |

Additional Embodiments

The application (or other documents) may be saved and closed by the agent at any time during the process. The system may save the incomplete application and any signatures already collected and then the system may close the application window.

There are times when not all customers are available for electronic signature at the same time. In that instance, the following process steps may occur. First, in step 210, the agent may leave the unavailable customer's consent unspecified. In step 220, the system might not allow the unavailable customer to sign electronically even if the customer's required forms were viewed because the customer has not given his consent in the previous step 210. The agent may review the forms and collect signatures of available customers as in the previously described process in steps 212-222. The agent may then save and close the application. When the remaining customer is available, the agent may re-open the application and navigate to the consent page. The agent may then complete the consent for the remaining customer as described in step 210. The agent may then review the forms and collect the signature of the remaining customer as described in steps 212-222. If any changes are made to the documents, the previously signing customer's signature may be automatically removed, such that every customer must re-sign when any changes are made.

A separate electronic signature consent authorization form may be used in addition to or as a replacement for the consent received in steps 208-210. The electronic signature consent authorization form may be an actual form that must be wet signed by all customers involved as well as the agent. The electronic signature consent authorization form may then be part of the submission package by the agent to the financial institution.

Illustrative User Interface

FIGS. 3-9 depict a set of illustrative user interface screens which represent an aspect of the invention. These figures are only illustrative user interface screens and a wide range and variety of user interface screens may be possible for this invention.

FIG. 3 depicts an illustrative user interface screen for choosing the application submission method 300. The Application Submission Method screen 300 may be used by the agent to select a "Submit with Electronic Signature" button 302 in order to submit the application with electronic signature. The agent may also select a "Submit Application by Fax" button 304 in order to submit the application by fax. The agent may also test the signature pad on the Application Submission Method screen 300 by selecting a "Test your signature pad now" link 306. The Application Submission Method screen 300 may be selected during step 206 from FIG. 2A.

On FIG. 3, a status bar 250 is shown. The status bar 250 includes the status of the application throughout the process and may be shown on each of the user interface screens. On the Application Submission Method screen 300, the status bar shows the status of the completion of the online application which may include: policy information, primary insured, owner/payor, additional/joint insured, children insured, beneficiaries, health information, other insurance, payment information, agent remarks, and agent report.

FIG. 4 depicts an illustrative user interface screen for indicating the consent to use electronic signature 400. The Customer Consent screen 400 may be used to indicate the customer's consent to use electronic signature. The customer may select an "I CONSENT to use Electronic Signature" button 402 to indicate the customer's consent. The customer may also select an "I DO NOT CONSENT to use Electronic Signature" button 404 to indicate that the customer does not consent to using the electronic signature. The Customer Consent screen 400 may be used during steps 208 and 210 from FIG. 2A.

On the Customer Consent screen 400, the status bar 250 shows the status of the electronic signature process which may include: owner consent, primary insured consent, view and sign forms (owner, primary insured, and agent), and submit. The Your Help section is also available on status bar 250, which may include: test signature pad, submit application by fax, unlock application, LRN, and FAQs.

Figure 5B:
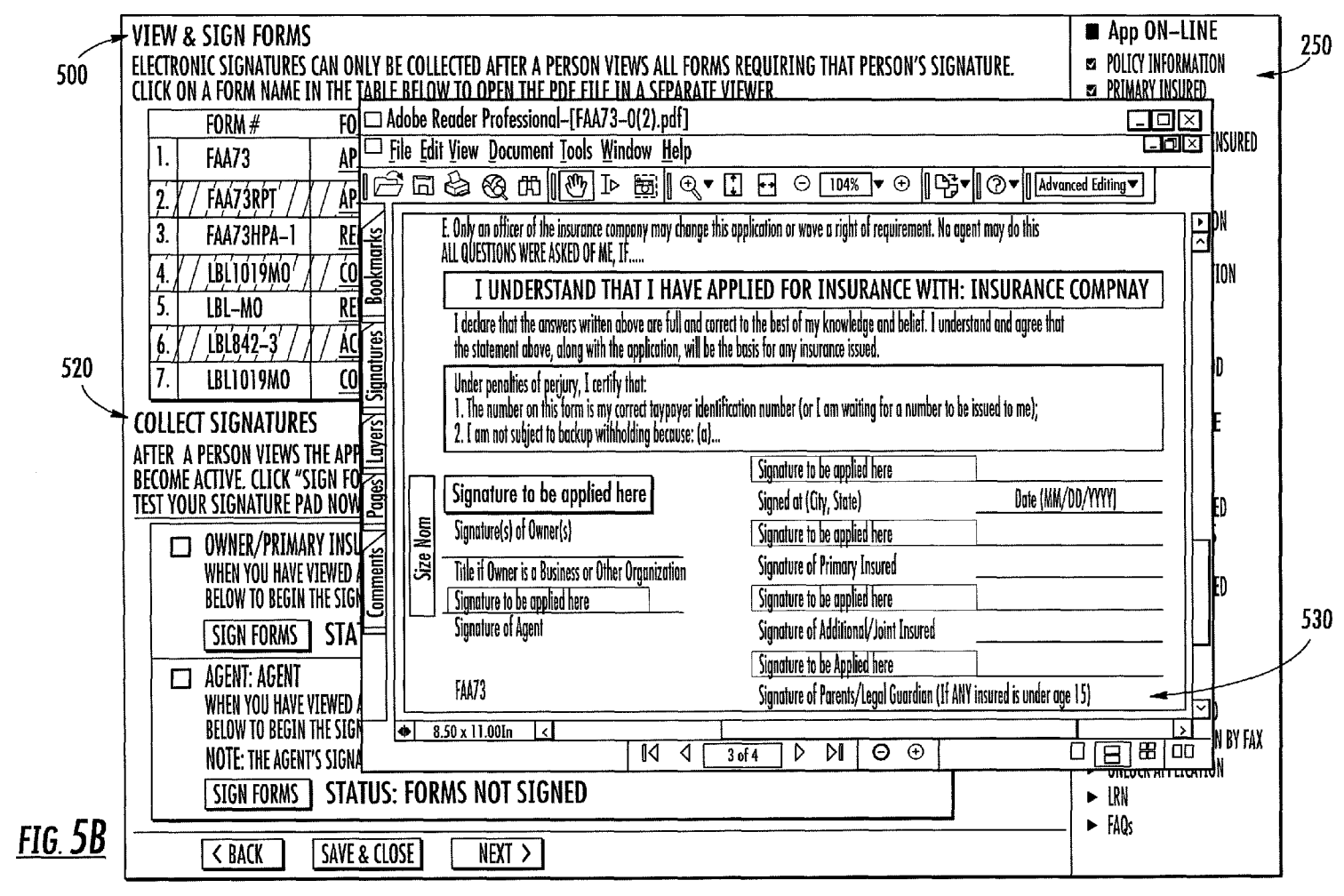

FIGS. 5A and 5B depict an illustrative user interface screen to view and sign forms and to collect signatures. In the View & Sign Form section 500, a table lists the available forms for the customer to view. The table may contain the following columns: a "Form #" column 502, a "Form Name" column 504, a "Signature Required" column 506, and a "Form Status" column 508. The "Form #" column 502 lists the form numbers for each of the forms used with the application. The "Form Name" column 504 lists the form names which may also be a hyperlink 510 to each of the forms. FIG. 5B depicts a form 530 opened in the separate window when the hyperlink 510 is clicked. A "Signature Required" column 506 lists the individuals whose signature is required for each individual form, such as Customer 1, Customer 2, or Agent. A "Form Status" column 508 lists whether the individual forms have been viewed as may be required by the system in order to electronically sign. The View and Sign Forms section 500 may be used during steps 212 and 214 from FIG. 2A.

A Collect Signatures section 520 lists the different individuals that must electronically sign the application. After the customer views the appropriate forms requiring that customer's signature, a "Sign Forms" button 522 becomes active. The agent or customer may then click the "Sign Forms" button 522 in order to move to a Collect Signature user interface screen 600. Also available on the Collect Signature section 520 is the area for the agent to sign the forms. The agent's signature may be captured after all other signatures have already been captured. At this time, a "Sign Forms" button 524 for the agent will become active. When the agent selects the "Sign Forms" button 524, the agent may then electronically sign on the Collect Signature screen 600. The Collect Signatures section 520 may be used during step 216 from FIG. 2A.

FIGS. 6A-6C depict illustrative user interface screens for collecting the signature during the electronic signature process. The Collect Signature screen 600 may be used to collect the signature of the customer or agent during the electronic signature process. The customer or agent may review the forms in which the customer's signature will be placed, where it states "Your signature will be applied to the following forms:" 610. In this table, there are the following columns: "Form #" 605, "Form Name" 606, and "Signature Required" 608.

FIG. 6A depicts the Collect Signature screen 600 with a "Sign" button 602 active. During this step, the agent or customer may press the "Sign" button 602 when they are prepared to sign (or initial) on the signature pad. Once the "Sign" button 602 is clicked or pressed, the signature pad may now be active and ready to collect signatures. A signature box 610 may be blank at this point until the signature is captured from the signature pad.

FIG. 6B depicts the Collect Signature screen 600 with a "Capture" button 612. After the customer signs or initials on the signature pad, the agent or customer may click on the "Capture" button 612 in order to save and collect that signature. At any point when the agent or customer is on the Collect Signature Screen 600, the agent or customer may select a "Cancel" button 603 which will cancel the electronic signature gathering process. An agent or customer may want to select the "Cancel" button 603 when, for example, the agent is having technical difficulties with the signature pad.

FIG. 6C depicts the Collect Signature screen 600 with a signature 616 inserted in the signature box 610, and a "Clear" button 614. Once the "Capture" button 612 from FIG. 6B is selected, the signature 616 is captured into the signature box 610. At this point, the customer may select the "Clear" button 614 in order to re-sign and clear the existing signature 616 from the signature box 610. If the customer is satisfied with the signature 616, the agent or customer may select an "Apply Signature" button 618. Selecting the "Apply Signature" button 618 applies the customer's signature to all forms in which the customer's signature is required. The Collect Signatures screen 600 may be used during steps 218 and 220 from FIG. 2B.

Figure 7:
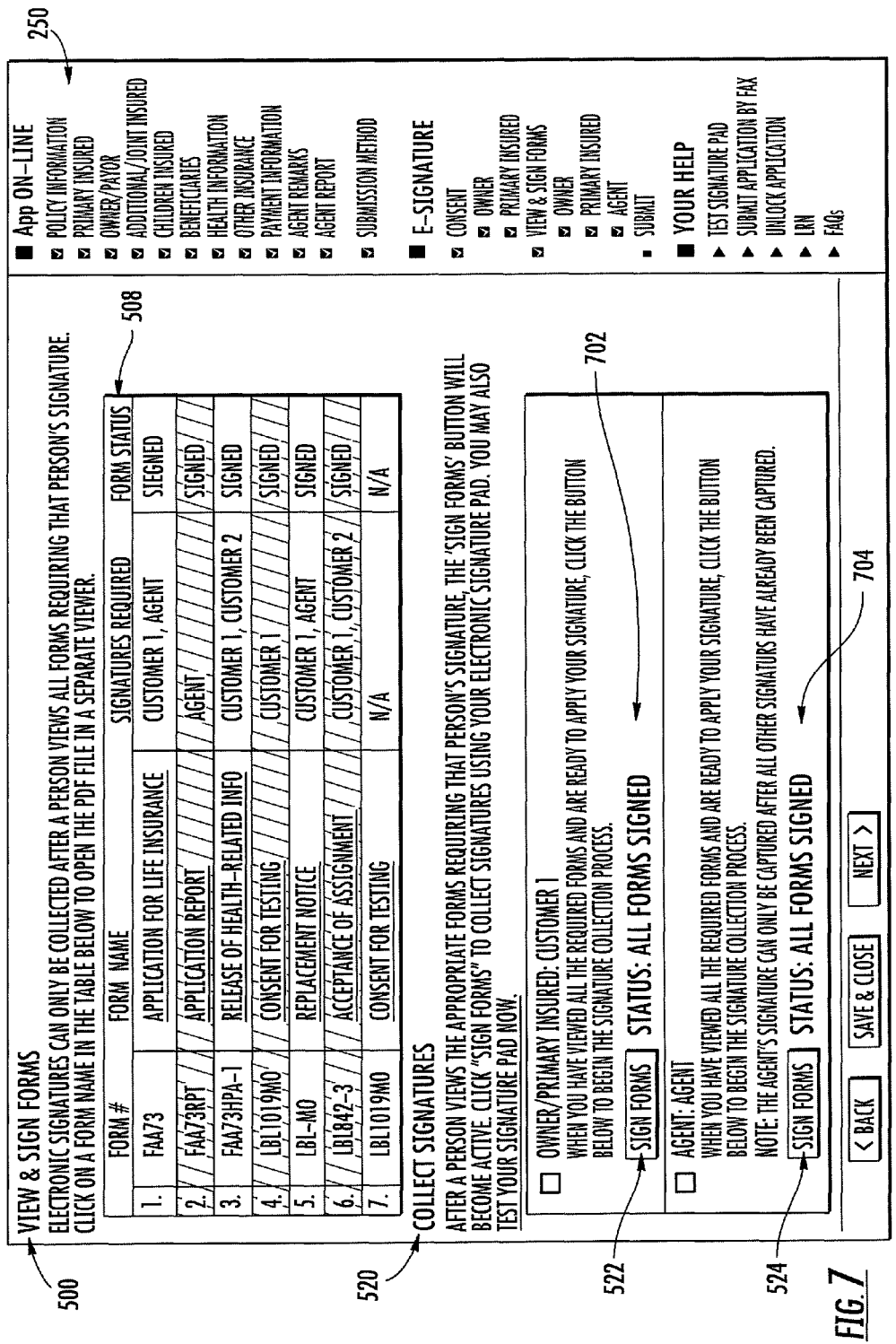

FIG. 7 depicts the View & Sign Forms section 500 and the Collect Signatures section 520 as in FIG. 5A following the collection of the signatures from the customers and agents. In the View & Sign Forms section 500 and the "Form Status" column 508, the status may be changed from "Not Viewed" to "Viewed" or to "Signed." Also, in the Collect Signatures section 520 and next to the "Sign Forms" buttons 522, 524, the status is listed as "Status: All Forms Signed" 702, 704.

FIG. 8 depicts an illustrative user interface screen of the Submit Application screen 800. On the Submit Application screen 800, the agent reads a submission statement 802. In order to submit the application, the agent must select an "I AGREE with the statements above" button 804. Once the "I AGREE with the statements above" button 804 is selected, the system overlays the captured signatures onto the forms requiring signatures and a "Submit" button 806 may then be activated. The agent or customer may then select the "Submit" button 806 in order to submit the application. The Submit Application screen 800 includes a statement such as: "You will not be able to make any changes to your application once submit has been clicked." The Submit Application screen 800 may be used during step 226 from FIG. 2B.

FIG. 9 depicts an illustrative user interface screen of the Confirmation screen 900. On the Confirmation screen 900, the customer or agent is able to select a "View & Print Submitted Application" button 902. After the "View & Print Submitted Application" button 902 is selected, the system may print the customer copies of the application with the signature in PDF format. The Confirmation screen 900 may be used during steps 228 and 230 from FIG. 2B.

While illustrative embodiments described herein embody various aspects are shown, it will be understood by those skilled in the art that the invention is not limited to these embodiments. Modifications may be made by those skilled in the art, particularly in light of the foregoing teachings. For example each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

What is claimed is:

1. An apparatus comprising:
   a display;
   a memory; and
   a processor coupled to the memory and programmed with computer-executable instructions that, when executed, perform a method comprising:
      electronically receiving a plurality of documents ready for signature by a customer wherein the plurality of documents comprise a plurality of signature locations;
      displaying on the display the plurality of documents;
      collecting a single-inputted electronic signature from the customer indicating the customer has reviewed and agrees with the plurality of documents, wherein the single-inputted electronic signature is utilized for the plurality of documents at the plurality of signature locations;
      receiving an approval by the customer to electronically sign the plurality of documents with the single-inputted electronic signature; and
      applying the single-inputted electronic signature to one or more of the plurality of documents at the plurality of signature locations.

2. The apparatus of claim 1, wherein the plurality of documents comprises an insurance application.

3. The apparatus of claim 1, wherein the plurality of documents comprises a set of mortgage papers.

4. The apparatus of claim 1, wherein the computer executable instructions further comprise submitting the plurality of documents with the single-inputted electronic signature.

5. The apparatus of claim 1, wherein the single-inputted electronic signature includes a graphical representation of the customer's handwritten signature.

6. The apparatus of claim 1, wherein the computer executable instructions further comprise:
   collecting a single-inputted electronic signature from an agent indicating the agent has reviewed and agrees with the plurality of documents; and
   applying the agent's single-inputted electronic signature to one or more of the plurality of documents at the plurality of signature locations.

7. The apparatus of claim 1, wherein the computer executable instructions further comprise:
   collecting a single-inputted electronic signature from a second customer indicating the second customer has reviewed and agrees with the plurality of documents; and
   applying the second customer's single-inputted electronic signature to one or more of the plurality of documents at the plurality of signature locations.

8. The apparatus of claim 1, wherein the single-inputted electronic signature comprises initials.

9. The apparatus of claim 1, further comprising a signature pad having a signature area for receiving a handwritten signature, wherein collecting the single-inputted electronic signature further comprises detecting an imprint on the signature pad handwritten by the customer.

10. A method of electronically signing documents, comprising:
    electronically receiving a plurality of documents ready for signature by a customer, wherein the plurality of documents comprise a plurality of signature locations;
    displaying on a display screen the plurality of documents;
    collecting a single-inputted electronic signature from the customer indicating the customer has reviewed and agrees with the plurality of documents, wherein the single-inputted electronic signature is utilized for the plurality of documents at the plurality of signature locations;
    receiving an approval by the customer to electronically sign the plurality of documents with the single-inputted electronic signature; and
    applying the single-inputted electronic signature to one or more of the plurality of documents at the plurality of signature locations.

11. The method of claim 10, wherein the plurality of documents comprises an insurance application.

12. The method of claim 10, wherein the plurality of documents comprises a set of mortgage papers.

13. The method of claim 10, further comprising electronically submitting the plurality of documents with the single-inputted electronic signature.

14. The method of claim 10, wherein the single-inputted electronic signature includes a graphical representation of the customer's handwritten signature.

15. The method of claim 10, further comprising:
collecting a single-inputted electronic signature from an agent indicating the agent has reviewed and agrees with the plurality of documents; and
applying the agent's single-inputted electronic signature to one or more of the plurality of documents at the plurality of signature locations.

16. The method of claim 10, further comprising:
collecting a single-inputted electronic signature from a second customer indicating the second customer has reviewed and agrees with the plurality of documents; and
applying the second customer's single-inputted electronic signature to one or more of the plurality of documents at the plurality of signature locations.

17. The method of claim 10, wherein the single-inputted electronic signature comprises initials.

18. The method of claim 10, wherein collecting the single-inputted electronic signature further comprises detecting an imprint on a signature pad having a signature area for the customer to handwrite the imprint.

19. A method for a customer and an agent to electronically sign an insurance application comprising:
electronically receiving the insurance application, wherein the insurance application is completed and ready for signature by the customer, further wherein the insurance application comprises a plurality of forms which comprise a plurality of signature locations;
displaying on a display screen the insurance application;
collecting a single-inputted electronic signature from the customer indicating the customer has reviewed and agrees with the insurance application;
receiving an approval by the customer to electronically sign the insurance application with the single-inputted electronic signature;
applying the single-inputted electronic signature to one or more of the plurality of forms at the plurality of signature locations;
collecting a single-inputted electronic signature from the agent indicating the agent has reviewed and agrees with the insurance application;
applying the agent's single-inputted electronic signature to one or more of the plurality of forms at the plurality of signature locations; and
submitting the insurance application.

20. The method of claim 19, wherein the single-inputted electronic signature includes a graphical representation of the customer's handwritten signature.

21. The method of claim 19, further comprising:
collecting a single-inputted electronic signature from a second customer indicating the second customer has reviewed and agrees with the insurance application; and
applying the second customer's single-inputted electronic signature to one or more of the plurality of forms at the plurality of signature locations.

22. The method of claim 19, wherein the single-inputted electronic signature comprises initials.

23. The method of claim 19, wherein collecting the single-inputted electronic signature further comprises detecting an imprint on a signature pad having a signature area for the customer to handwrite the imprint.

* * * * *